S. J. OAKES.
BRAKE.
APPLICATION FILED AUG. 14, 1907.

904,983.

Patented Nov. 24, 1908.

Witnesses
F. C. Gibson.
John F. Byrne

Inventor
Samuel J. Oakes.
By Victor J. Evans
Attorney

UNITED STATES PATENT OFFICE.

SAMUEL J. OAKES, OF BOSTON, MASSACHUSETTS.

BRAKE.

No. 904,933.   Specification of Letters Patent.   Patented Nov. 24, 1908.

Application filed August 14, 1907. Serial No. 388,539.

*To all whom it may concern:*

Be it known that I, SAMUEL J. OAKES, a citizen of the United States of America, residing at Boston, in the county of Suffolk and State of Massachusetts, have invented new and useful Improvements in Brakes, of which the following is a specification.

My invention relates to brakes, and its primary object is to provide a device of this character which is especially designed for use on automobiles as an auxiliary brake, and by means of which automobiles may be held against movement when stopped on an incline.

A further object of my invention is to provide a brake which is simple of construction, which may be manufactured and sold at a comparatively low cost, and which may be readily attached to an automobile of any construction.

A still further object of my invention is to provide a brake which is capable of being at all times under full control of the operator of the automobile.

Figure 1:
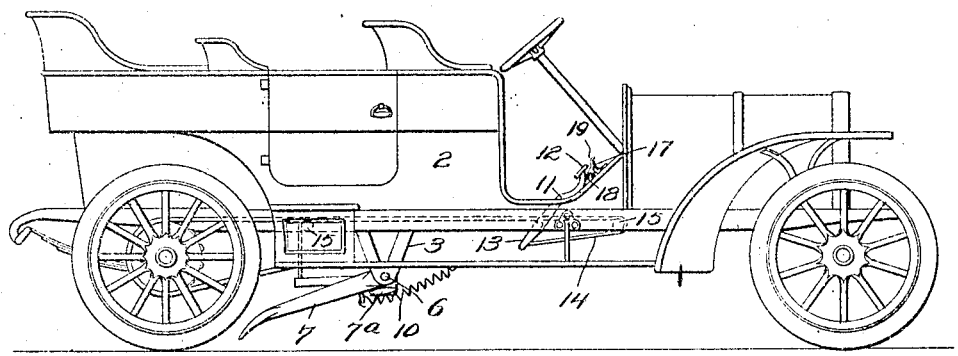
Figure 2:
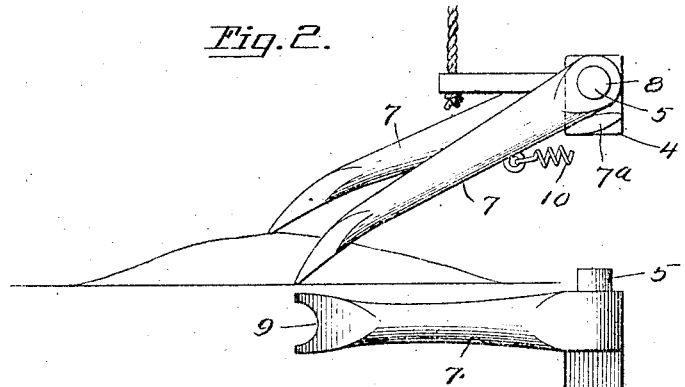
Figures 3, 4:
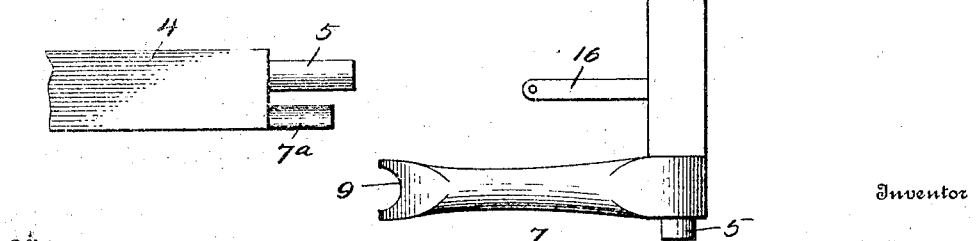

With the above and other objects in view, the invention consists in the construction, combination and arrangement of parts hereinafter fully described, claimed and illustrated in the accompanying drawing, wherein:

Figure 1 is a view in side elevation, illustrating the application of my improved brake. Fig. 2 is a view in side elevation of the brake. Fig. 3 is a top plan view thereof, and Fig. 4 is a plan view of a portion of one end of the shaft.

Referring to the drawing by reference numerals, 2 designates an automobile of a well known construction, and 3 designates one of a pair of bearing brackets which are secured to and depend from the floor of the automobile. A shaft 4 has its ends reduced to provide journals 5, said journals being adapted to be received by the bearings 6 of the brackets 3. Chock levers 7 are mounted on the shaft 4 for relatively independent upward movements thereon. The downward movement of the chock levers is limited by means of lugs 7ª which project from the ends of the shaft 4 at points beneath the journals 5, and are adapted to engage the under sides of the chock levers. Each of the chock levers 7 has one of its ends provided with an opening or bearing 8 adapted to receive one of the journals 5 of the shaft 4, and its other or free end forked, as at 9, to facilitate its engagement with the ground. The chock levers 7 are mounted upon the journals 5 between the ends of the shaft 4 and the brackets 3, thereby obviating the necessity of the use of nuts or other fastening devices for securing the levers in applied position. When the chock levers 7 are in operative position, the free ends are yieldingly held in engagement with the ground by means of contractile springs 10, one only of the springs being shown. One end of each of the springs 10 is secured to the lever and the other end to the automobile. The chock levers 7 are adapted to be moved into and supported in inoperative position by means of a foot lever 11, which is pivotally mounted to position its power end 12 in convenient reach of the operator of the automobile and its operating end 13 at a point below the floor of the automobile. A cable 14, passing over pulleys 15, has one of its ends secured to the operating end 13 of the lever 11 and its other end to a rearwardly projecting arm 16 secured to the shaft 4. The connection between the lever 11 and the shaft 4 is such that when a downward pressure is applied to the power end 12 of the lever, the shaft is turned on its journal and the chock levers 7 elevated through the medium of the lug 7ª. A spring pressed dog 17 is mounted for automatic engagement with a lug 18 on the lever 11, and it is adapted to retain the chock levers 7 in inoperative position. The dog 17 is provided with a tail piece 19 which extends above the power end 12 of the lever 11, whereby the dog may be thrown out of engagement with the lug 18 by the foot of the operator when it is desired to use the brake. As soon as the lever 11 is released, the spring 10 moves the free ends of the chock levers 7 into engagement with the ground, and rocks the shaft 4 on its journals through the medium of the lugs 7ª. This movement of the shaft moves the power end 12 of the lever 11 in proper position for the application of the power to move the chock levers 7 into inoperative position. As the chock levers 7 project in a rearward direction, the brake may be used while ascending an incline to stop the automobile should an accident occur, and as said levers may have relatively independent forward movements on the shaft 4, any irregularities on the surface of the ground are compensated for. The brake is also adapted to be used when the automobile is stopped on an incline, and it may, if desired, be used with the ordinary wheel brake of an automobile. Should the automobile be stopped on an incline, the brake will prevent any lost rearward motion during the starting of the engine.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim as new is:

1. A brake including a shaft provided with journals and lugs, chock levers pivotally mounted on the journals above the lugs and having their free ends forked, means by which the brake may be controlled, and means adapted to yieldingly retain the chock levers in engagement with the ground.

2. A brake including a shaft, chock levers pivotally mounted thereon, lugs on the shaft adapted for engagement with the chock levers, means adapted to yieldingly retain the chock levers in engagement with the ground, a pivotally mounted foot lever, an arm on the shaft, a connection between the arm and foot lever, and means adapted to engage the foot lever to retain the chock levers in inoperative position.

3. A vehicle brake including a rotatably mounted shaft, a chock lever pivotally mounted upon the shaft, a lug fixed upon the shaft, said lug being adapted to engage and elevate the chock lever when the shaft is rotated, and means by which the shaft may be rotated.

4. A vehicle brake including a rotatably mounted shaft, a lug fixed on the shaft, said lug being adapted to engage and elevate the chock lever when the shaft is rotated, and an arm secured to the shaft.

5. A vehicle brake including a shaft provided with journals and lugs, chock levers pivotally mounted on the journals, and means by which the shaft may be rotated, said lugs being adapted to engage and elevate the chock levers when the shaft is rotated.

6. A vehicle brake including a shaft provided at its ends with journals and lugs, chock levers pivotally mounted on the journals, and means by which the shaft may be rotated, the lugs being adapted to engage and elevate the chock levers when the shaft is rotated.

7. A vehicle brake including a rotatably mounted shaft, a chock lever pivotally mounted on the shaft, a lug fixed on the shaft, said lug being adapted to engage and elevate the chock lever when the shaft is rotated, means by which the shaft may be rotated, and a spring adapted to yieldingly retain the chock lever in engagement with the ground.

In testimony whereof I affix my signature in presence of two witnesses.

SAMUEL J. OAKES.

Witnesses:
J. E. KEMP,
WM. GOODWIN.